(12) United States Patent
Matsumoto

(10) Patent No.: US 7,647,593 B2
(45) Date of Patent: Jan. 12, 2010

(54) IMAGE PROCESSING SYSTEM FOR VOLUME RENDERING

(75) Inventor: Kazuhiko Matsumoto, Tokyo (JP)

(73) Assignee: Ziosoft, Inc., Tokyo (JP)

( * ) Notice: Subject to any disclaimer, the term of this patent is extended or adjusted under 35 U.S.C. 154(b) by 1105 days.

(21) Appl. No.: 10/954,876

(22) Filed: Sep. 30, 2004

(65) Prior Publication Data
US 2005/0278408 A1 Dec. 15, 2005

(30) Foreign Application Priority Data
May 25, 2004 (JP) ............................ P.2004-154261

(51) Int. Cl.
*G06F 9/46* (2006.01)
(52) U.S. Cl. ...................... 718/106; 718/100; 718/101; 718/103; 718/105; 712/28; 712/203; 719/312; 719/313
(58) Field of Classification Search ................. 718/100, 718/101, 103, 105, 106; 719/312, 313; 712/28, 712/203
See application file for complete search history.

(56) References Cited

U.S. PATENT DOCUMENTS

| 5,524,257 | A | * | 6/1996 | Koike et al. ................... 706/10 |
| 5,793,376 | A | * | 8/1998 | Tanaka et al. ................ 345/582 |
| 6,321,266 | B1 | * | 11/2001 | Yokomizo et al. ........... 709/226 |
| 2003/0174132 | A1 | * | 9/2003 | Kunimatsu et al. ........... 345/419 |
| 2005/0010608 | A1 | * | 1/2005 | Horikawa ................... 707/200 |

FOREIGN PATENT DOCUMENTS

| JP | 03-020843 | 1/1991 |
| JP | 11-175485 | 7/1999 |
| JP | 2003-233600 | 8/2003 |

OTHER PUBLICATIONS

Author: Booth et al.☐☐Title: Web Service Architecture Date: Feb. 11, 2004☐☐Publisher: W3C (Working Group Note Feb. 11, 2004☐☐pp. 1,2, and 7☐☐.*
Polyzotis, N. et al. Speculative Query Processing. IN: *Proceedings of the 2003 CIDR Conference.* Jan. 5-9, 2003. Asilomar, CA.
Lichtenbelt, B et al. Introduction to Volume Rendering.. Hewlett-Packard Professional Books; Chapter 6, pp. 121-138, published in 1998.
Japanese Office Action Dated Jun. 13, 2007.

* cited by examiner

*Primary Examiner*—Andy Ho
(74) *Attorney, Agent, or Firm*—Pearne & Gordon LLp

(57) ABSTRACT

A CPU 111m segments the jobs from each of the volume rendering processing on hand, prioritize processing sequence for each job, transmits one job which has reached the processing order to the computers (21 to 2k) on the accepting side and other computers equivalent to the self computer simultaneously, and executes the job for self processing. Then, after if receiving the processing result from the computer which has completed the processing of the transmitted job the earliest, the CPU 111m issues a halt command of the job to other computers on the accepting side. At this time, if any job to be requested on hand remains uncompleted, a series of processing procedures starting with the simultaneous communication is repeated.

13 Claims, 6 Drawing Sheets

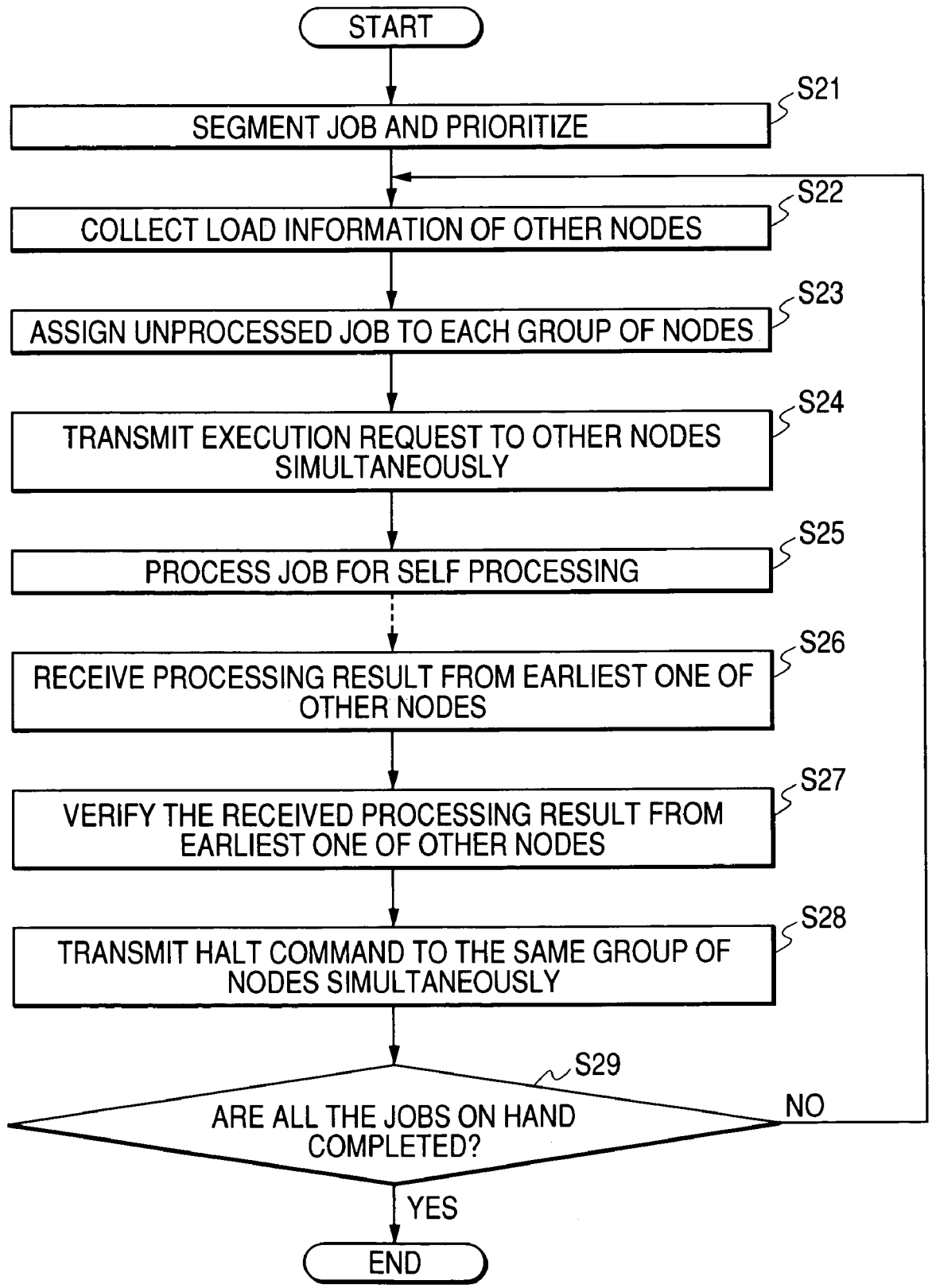

IMAGE PROCESSING SYSTEM FOR VOLUME RENDERING

This application claims foreign priority based on Japanese Patent application No. 2004-154261, filed May 25, 2004, the contents of which is incorporated herein by reference in its entirety.

BACKGROUND OF THE INVENTION

1. Field of the Invention

The present invention relates to an image processing system for volume rendering, and more particularly to an image processing system for performing a volume rendering image processing or a region segmentation processing, using a plurality of computers connected via a network.

2. Description of the Related Art

With the development of an image processing technique using the computer, the appearance of CT (Computed Tomography) scanner and MRI (Magnetic Resonance Imaging) that enables an internal structure of the human body to be directly observed has brought about innovation in the medical field. A medical diagnosis using a tomographic image of the living body has been widely performed. In recent years, as a technique for visualizing the three dimensional structure inside the complex human body which is difficult to recognize only with the tomographic image, for example, a processing technique for directly drawing an image of the corresponding three dimensional structure from the three dimensional digital data of the object obtained from CT scanner or other image acquiring system, particularly an image processing called the volume rendering, has widespread, and has been employed for medical diagnosis.

Conventionally, a ray casting has been well known as a superior method for volume rendering. The ray casting is a method for forming an transparent image of the three dimensional structure inside the object by radiating virtual rays from a virtual starting point to the object, and forming the image of a virtual reflected light which comes from inside the object on a virtual projection plane. A fundamental theory of the ray casting is described in "Introduction To Volume Rendering", written by Barthold Lichtenbelt, Randy Crane, and Shaz Naqvi, Hewlett-Packard Professional Books (published in 1998), Chapter 6, pg. 121-138, for example.

Herein, the ray casting is briefly described.

A minute unit area forming a constituent unit of the three dimensional area of the object is called a voxel, and the intrinsic data of the voxel representing the characteristic such as a density value is called a voxel value. The entire object is represented by the voxel data which is the three dimensional array of the voxel values. Usually, two dimensional tomographic image data obtained by CT scanner or other image acquiring system is layered along a direction perpendicular to a tomographic face, and interpolated, as required, whereby the voxel data of the three dimensional array is obtained.

A virtual reflected light from the virtual rays radiated from the virtual starting point to the object is produced in accordance with opacity, an opacity value, which is artificially set by the voxel value. Moreover, in order to shade a virtual surface stereoscopically, a gradient of the voxel data, that is a normal vector, is obtained, and the shading factor for shading is calculated from the cosine of an angle between the virtual ray and the normal vector. The virtual reflected light is calculated by multiplying the intensity of the virtual rays radiated to the voxel by the opacity of voxel and the shading factor. The virtual reflected light is integrated along the virtual rays, and calculated for all the coordinate points on the virtual projection plane, whereby the virtual transparent image of three dimensional structure is formed. The above calculation is hereinafter referred to as a "volume rendering process".

A volume rendering image obtained as described above is a three dimensional color image drawn by using a number of volume rendering parameters for the subject voxel data.

The volume rendering parameters include the display control information such as enlargement ratio, angle and position, the color designation information, the correspondence information between the voxel value and the opacity value, the shading information, an image filter, an image synthesis method, a rendering means, a light source, a time series and phase information, a projection method, a display area information, and a segmented area information. These pieces of information are referred to as the "additional information" in the following.

In the practical medial diagnosis, the user of a medical image processing system observes the volume rendering image from various points of view by successively updating the settings of the volume rendering parameters, which is an additional information, for the subject voxel data. For example, since the adequate opacity value varies according to a diagnosis object, the user sets up the opacity value for each voxel data. Also, in order to easily observe an area of interest such as a diseased part, the peripheral tissue obstructing the observation is removed, and the appropriate color of tissue is set.

Besides, it is necessary for the user to set the parameters by performing various complicating operations. If the appropriate parameters are set and the volume rendering image which meets the diagnosis purpose is obtained, an edit operation is ended.

Conventionally, the total process of image processing of volume rendering, including storage, calculation and display, is performed by one or more computers. Especially when a plurality of computers are employed, various measures are taken mainly for the distribution of computer resources requiring an enormous amount of computation and the parallel processing.

Also, various methods for distributing the total process of image processing of volume rendering over a plurality of computers have been offered (e.g., refer to JP-A-2003-233600).

In the conventional volume rendering image processing system, various measures are taken for the distribution of computer resources and the parallel processing, as previously described.

However, in the volume rendering which requires a large amount of computation at high precision and in real time, there is a limit if the total computation is performed by the computer resource of one computer.

Thus, when a plurality of computers is employed, it is required that the volume rendering processing is partitioned beforehand into appropriate jobs, which is equal to loads, so as to make the plurality of computers execute distributed processing. Generally, its management is very difficult, and may cause an overhead, which lowers the system efficiency in the worst case.

Particularly, even though the load information and resource use situation of the plurality of computers are collected beforehand to assign the jobs fairly, it is not easy to predict the end time.

SUMMARY OF THE INVENTION

This invention has been achieved to solve above-mentioned problems, and it is an object of the invention to provide a volume rendering image processing system which shortens processing time of volume rendering by making effective use of a plurality of CPU resources within a network without need of predicting the end time.

To accomplish above object, first aspect of the invention provides an image processing system for generating an image of a three dimensional structure using a volume data of an object, the image processing system having at least one computers on a job requesting side and a second plurality of nodes on a job accepting side coupled via a network, where at least one of a group of computers on a job requesting side is constituted in combination with a control portion comprising at least a processor, a memory, a communication control portion, and a database management portion, and a storage media including at least an image data database, the control portion being operative to segment a plurality of jobs from each of a plurality of image processing requests in an image processing operation that use the volume data, prioritize each of the segmented jobs, transmit an execution request of the segmented jobs to at least any one of (a) another group of computers on the job requesting side, and (b) the second plurality of nodes on the job accepting side, verify a processing result of the jobs by receiving the processing results of the jobs from an earliest one of the first plurality of computers and the second plurality of nodes that completes processing of the execution request, and transmit a halt command of the jobs to the first plurality of computers and the second plurality of nodes, except for the earliest one of the first plurality of computers and the second plurality of nodes.

With this constitution, the volume rendering processing on hand is segmented into small jobs, each of the small jobs being assigned to the plurality of computers within the network, including the computers having a job requesting right equivalent to the self computer, and the processing result of the node that has completed the processing earliest is received, whereby the volume rendering image processing system is realized in which the processing time of the volume rendering processing on hand is greatly shortened in total.

Also, because an execution request of the job is made without considering the actual load factor of the node and the processing capability on the job accepting side, it is possible to avoid the overhead of the computer on the job requesting side.

Second aspect of the invention provides an image processing system for generating an image of a three dimensional structure using a volume data of an object, the image processing system having a first plurality of computers on a job requesting side and a second plurality of nodes on a job accepting side coupled via a network, where at least one of a group of computers on a job requesting side is constituted in combination with a control portion comprising at least a processor, a memory, a communication control portion, and a database management portion, and a storage media including at least an image data database, the control portion being operative to segment a plurality of jobs from each of a plurality of image processing requests in an image processing operation that use the volume data, prioritize each of the segmented jobs, transmit an execution request of the segmented jobs to at least any one of (a) another group of computers on the job requesting side, and (b) the second plurality of nodes on the job accepting side, acquire a progress information in each computer or node which is processing the jobs, and transmit a halt command of the execution request to one or more computers or nodes processing the jobs, based on the progress information.

With this constitution, the node of slow processing can be stopped to perform the processing in the course of processing without waiting to receive the processing result of the job from the node that has completed the processing the earliest, whereby the wasteful process of computer resources are not continued and the volume rendering processing is performed more efficiently.

Third aspect of the invention provides the image processing system using volume data according to first or second aspect of the invention, characterized in that the image processing using the volume data includes at least one or more processing among a volume rendering processing, a region segmentation processing, a filtering processing, a noise removal processing, an image synthesis processing, a perfusion computation processing, a back projection processing, a projection processing, and a geometry transformation processing.

With this constitution, various processings using the volume data are performed besides volume rendering processing, whereby the image is displayed at higher speed.

Fourth aspect of the invention provides the image processing system using the volume data according to first or second aspect of the invention, characterized in that in segmenting the plurality of jobs, the jobs are segmented by analyzing three dimensional digital data of an object corresponding to the image processing using the volume data.

With this constitution, it is possible to surely make the correspondence between the job to be assigned and the specific three dimensional digital data of the object obtained from CT scanner or other image acquiring system.

Fifth aspect of the invention provides the image processing system using the volume data according to first or second aspect of the invention, characterized in that before segmenting the plurality of jobs, in the computer transmitting the execution request of the jobs, a load factor of other computers and nodes connected via the network is verified, and the computers and nodes to which the jobs are transmitted are grouped, based on the load factor and a difficulty of each of the segmented jobs.

With this constitution, the nodes which accept the job are grouped considering the current load factor of the node that has accepted the job and the difficulty of the job, whereby the volume rendering image processing system is realized in which the processing time of the volume rendering processing on hand is greatly shortened in total.

Sixth aspect of the invention provides the image processing system using the volume data according to first or second aspect of the invention, characterized in that in the computer transmitting the execution request of the jobs, a job for self processing is executed after simultaneous transmission of the execution request of the jobs.

With this constitution, for example, an edit operation of the processing result, such as various transformation processings for displaying the result and the like, in the volume rendering processing of one cycle before, can be performed on the side of the computer which transmits the execution request of the job.

Seventh aspect of the invention provides the image processing system using the volume data according to first or second aspect of the invention, characterized in that each of the nodes receiving the execution request of the jobs performs the image processing corresponding to the jobs, independently of other nodes, and transmits the processing result to the computer transmitting the execution request of the jobs.

With this constitution, the accepted job is processed in the node that can process the job the earliest as a result, whereby the execution time of the job is always optimized.

Eighth aspect of the invention provides the image processing system using the volume data according to first or second aspect of the invention, characterized in that the network is composed of the Internet or other connection lines including the Internet.

With this constitution, a wide area system for volume rendering image processing is constructed without overhead, whereby the volume rendering image processing system is provided in which the processing time of volume rendering is always shortened substantially and infinitely.

Ninth aspect of the invention provides the image processing system using the volume data according to first or second aspect of the invention, characterized in that the image processing at the final step of the image processing using the volume data is performed only on a console of user.

With this constitution, the image processing at the final step is not usually a very heavy load, and the image is finally displayed on the display of the user console, whereby the processing results of the nodes are unified sooner or later. The operability of the user is made better if they are unified in good time.

Tenth aspect of the invention provides the image processing system using the volume data according to ninth aspect of the invention, characterized in that the image processing at the final step of the image processing using the volume data is performed within a GPU, a Graphic Processing Unit, of the console of the user.

With this constitution, the image processing at the final step is not usually a very heavy load, and the image is finally displayed on the display of the user console, whereby rapid processing is performed by employing the GPU which is good at image display.

A further aspect of the invention provides a method of image processing for generating an image of a three dimensional structure using a volume data of an object, where a first plurality of computers on a job requesting side and a second plurality of nodes on a job accepting side coupled via a network are provided, said method comprising segmenting a plurality of jobs from each of a plurality of image processing requests in an image processing operation that use the volume data in at least one of a group of computers on a job requesting side, prioritizing each of said segmented jobs, transmitting an execution request of said segmented jobs to at least any one of (a) another group of computers on the job requesting side, and (b) said second plurality of nodes on the job accepting side, verifying a processing result of said jobs by receiving said processing results of said jobs from an earliest one of said first plurality of computers and said second plurality of nodes that completes processing of said execution request, and transmitting a halt command of said jobs to said first plurality of computers and said second plurality of nodes, except for said earliest one of said first plurality of computers and said second plurality of nodes.

A further aspect of the invention provides a method of image processing for generating an image of a three dimensional structure using a volume data of an object, where a first plurality of computers on a job requesting side and a second plurality of nodes on a job accepting side coupled via a network are provided, said method comprising segmenting a plurality of jobs from each of a plurality of image processing requests in an image processing operation that use the volume data in at least one of a group of computers on a job requesting side, prioritizing each of said segmented jobs, transmitting an execution request of said segmented jobs to at least any one of (a) another group of computers on the job requesting side, and (b) said second plurality of nodes on the job accepting side, acquiring a progress information in each computer or node which is processing said jobs, and transmitting a halt command of said execution request to one or more computers or nodes processing said jobs, based on said progress information.

BRIEF DESCRIPTION OF THE DRAWINGS

FIG. 6 is a flowchart showing an operation of another computer on the job requesting side in the volume rendering image processing system according to the embodiment of the invention.

DESCRIPTION OF THE PREFERRED EMBODIMENTS

The best mode for carrying out the present invention will be described below with reference to the accompanying drawings.

Figure 1:
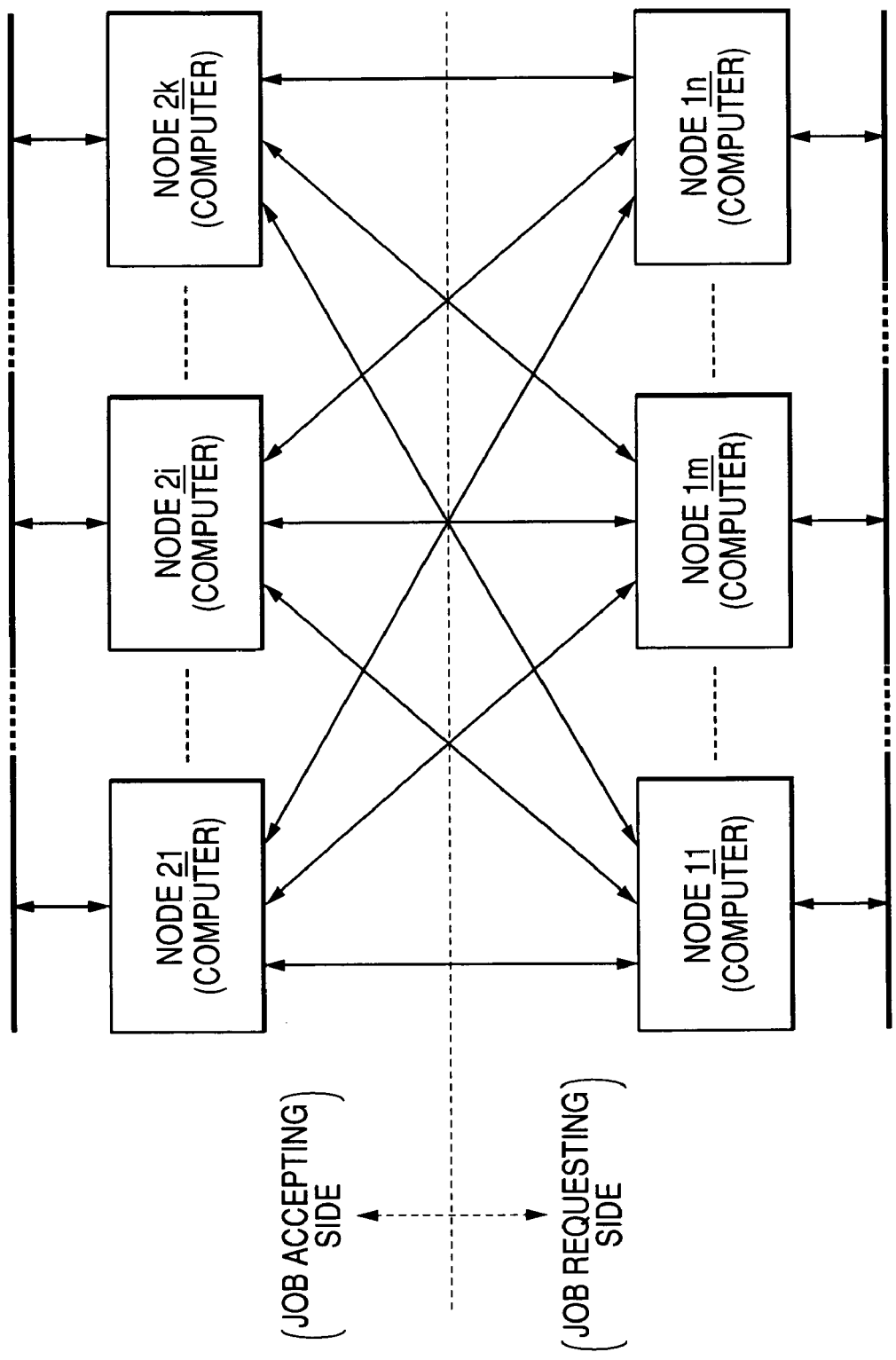
FIG. 1 is a block diagram showing a network configuration of a volume rendering image processing system according to an embodiment of the present invention.

FIG. 1 is a block diagram showing a network configuration of a volume rendering image processing system according to one embodiment of the invention.

As shown in FIG. 1, the network configuration of the volume rendering image processing system according to the embodiment comprises the nodes 11 to 1n on the job requesting side in which a volume rendering processing is segmented into jobs, and the nodes 21 to 2k on the job accepting side. Each of the nodes is connected to a network and communicable with other nodes via the network. The term "node" as used herein means a computer as a computing unit, and a supercomputer containing a plurality of CPUs, a server, a personal computer, and a notebook personal computer may respectively be all one nodes.

The nodes 11 to 1n are in the equivalent relation with each other. Also, the nodes 21 to 2k are in the equivalent relation with each other.

Figure 2:
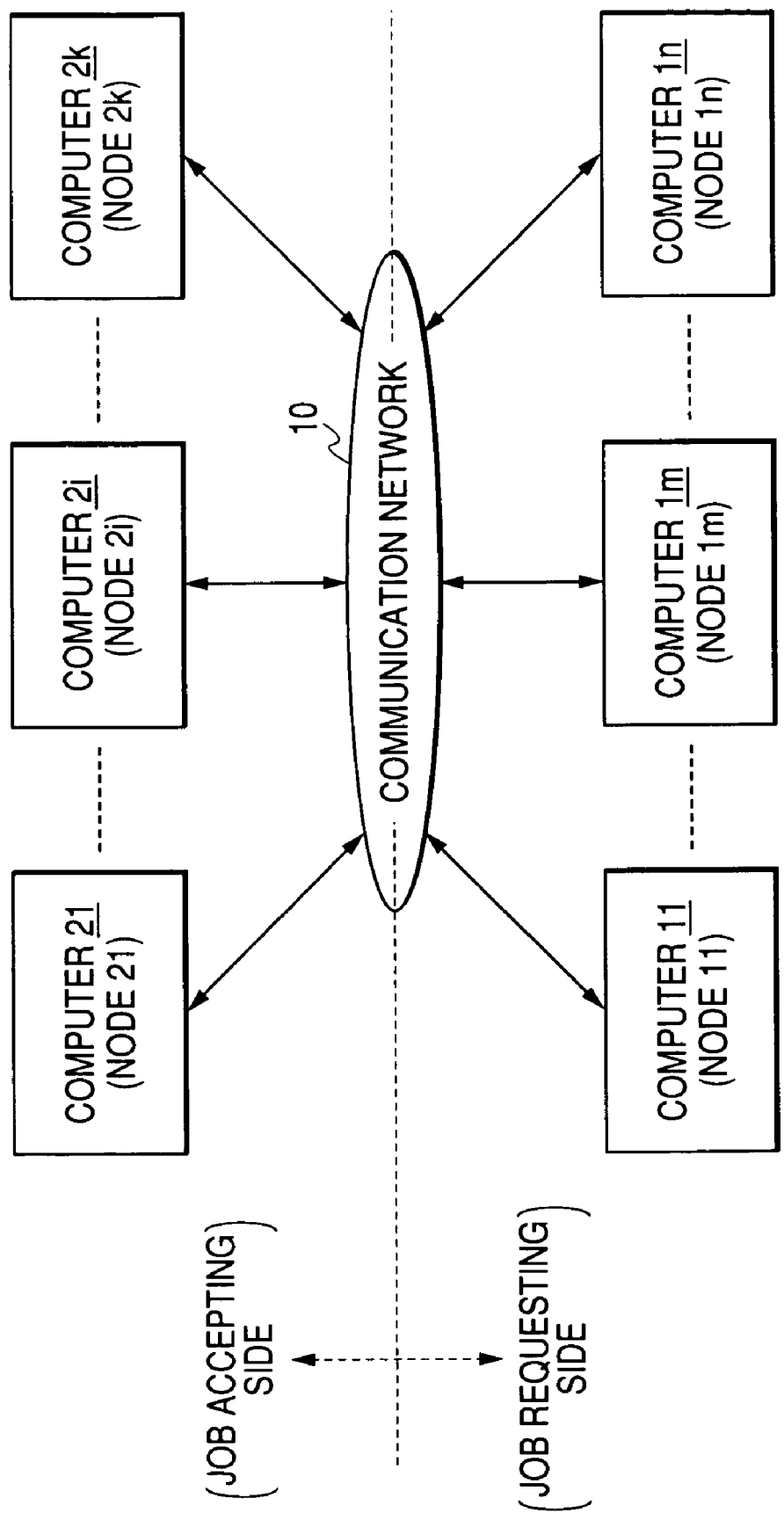
FIG. 2 is a block diagram showing the overall configuration of the volume rendering image processing system according to the embodiment of the invention.

FIG. 2 is a block diagram showing the overall configuration of the volume rendering image processing system according to the embodiment of the invention.

The overall configuration of the volume rendering image processing system as shown in FIG. 2 corresponds to the network configuration as shown in FIG. 1.

As shown in FIG. 2, the volume rendering image processing system according to the embodiment comprises the computers 11 to 1n on the job requesting side in which a volume rendering processing is segmented into jobs, and the nodes 21 to 2k on the job accepting side.

Each of the nodes is connected to a communication network 10 and communicable with other nodes via the communication network 10.

The communication network 10 may be the Internet, or other connection lines which includes the Internet or which connects the Internet.

The other connection lines connecting the Internet include the public network, the ISDN, the packet communication line, the frame relay network, the ATM line, the private line, the ADSL, the PHS line, or the optical communication cable line. Also, other lines which will spread in the future such as CATV are usable as far as the specifications of the lines allow the Internet to be used.

In the case where the communication network 10 comprises the Internet, the volume rendering image processing system according to the invention becomes a new scheme of a grid computing system.

Figure 3:
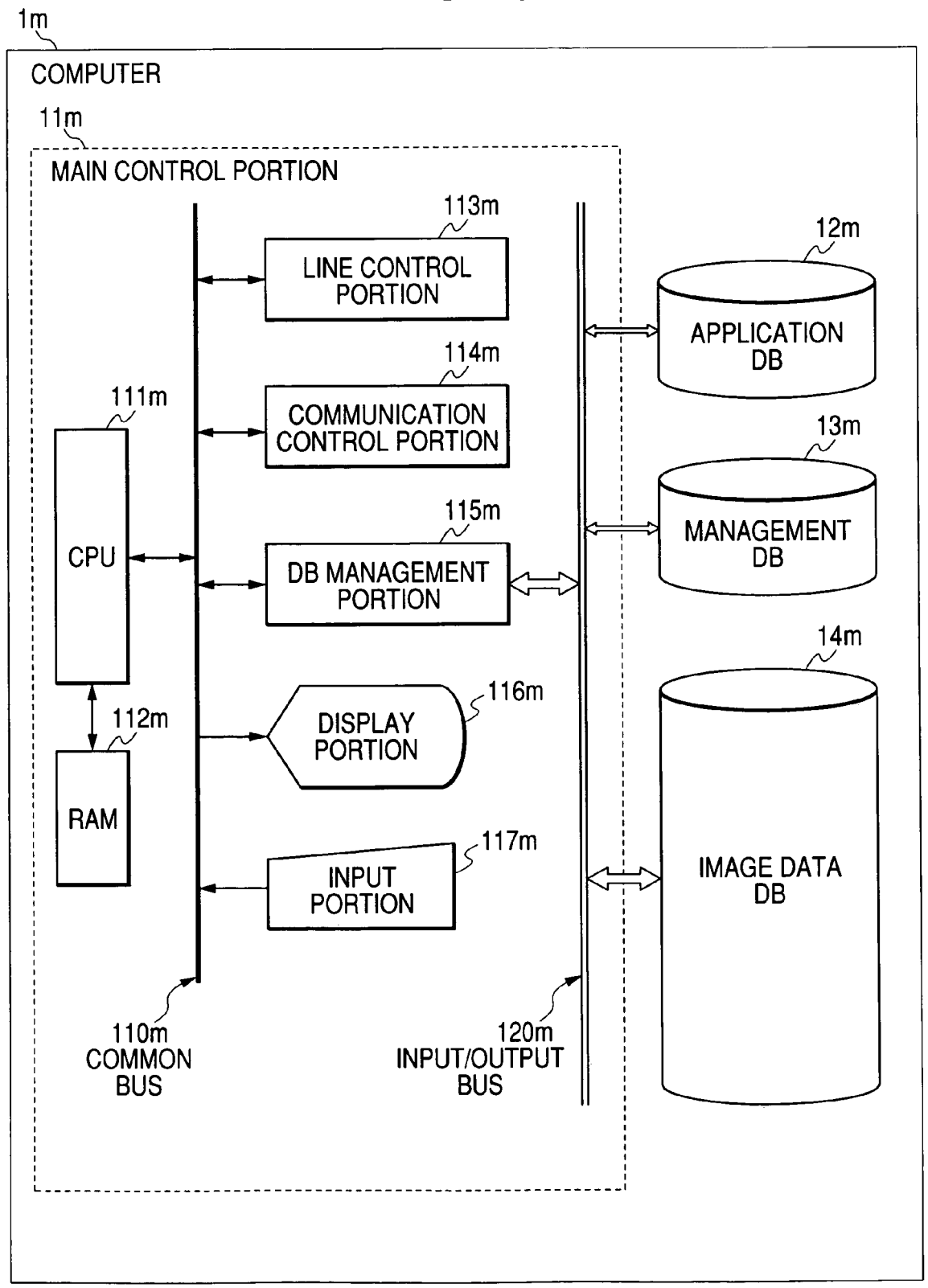
FIG. 3 is a block diagram showing the configuration of a computer on the job requesting side in the volume rendering image processing system according to the embodiment of the invention.

FIG. 3 is a block diagram showing a configuration of a computer on the job requesting side in the volume rendering image processing system according to the embodiment of the invention.

In FIG. 3, the configuration of arbitrary computer 1*m* on the job requesting side as shown in FIG. 2 is illustrated. The configuration of other computers on the job requesting side is the same as the configuration of the computer 1*m*.

The computer on the job requesting side as shown in FIG. 3 comprises a main control portion 11*m* for controlling the entire system and processing the job for self processing, an application DB (database) 12 used for general applications, a management DB 13*m* recording an information required for management of the other node, and an image data DB 14*m* storing the three dimensional digital data of the object obtained from CT scanner or other image acquiring system.

The main control portion 11*m* comprises a CPU 111*m* which controls the entire system, a RAM 112*m* into which the three dimensional digital data of the object is read, a line control portion 113*m* having a router function, a communication control portion 114*m* having a communication function, a DB management portion 115*m* which controls each database, a display portion 116*m* for displaying the image data, an input portion 117*m* to input the operation information, a common bus 110*m* which transmits a command and data between the CPU 111*m* and the other components, and an input/output bus 120*m* which transmits a control signal and data between the DB management portion 115*m* and each database.

The RAM 112*m* stores the three dimensional digital data of the object read from the image data DB 14*m*, and supplies the three dimensional data to the CPU 111*m*, as needed.

The line control portion 113*m* is used for a connection to the communication network 10 as shown in FIG. 2, and concretely comprises a router mounting a digital service unit (DSU) or a firewall application to prevent invasion.

The communication control portion 114*m* controls communication processing with other nodes. This communication control portion 114*m* may comprise an NTP (Network Time Protocol) server for time synchronization on the Internet, and an NFS (Network File System) server for distributed file system. The communication control portion 114*m* further holds an encryption communication protocol for encrypted data transfer, and enables to perform an encryption communication service.

The DB management portion 115*m* controls the application DB 12*m*, the management DB 13*m* and the image data DB 14*m*, a command from the CPU 111*m*, and inputs or outputs data stored in the databases into or from the CPU 111*m*.

The display portion 116*m* displays the image of three dimensional structure corresponding to the three dimensional digital data of the object, by a command and a supply of data from the CPU 111*m*.

The input/output portion 117*m* is used to allow the user to input a command required for volume rendering processing or display.

Figure 4:
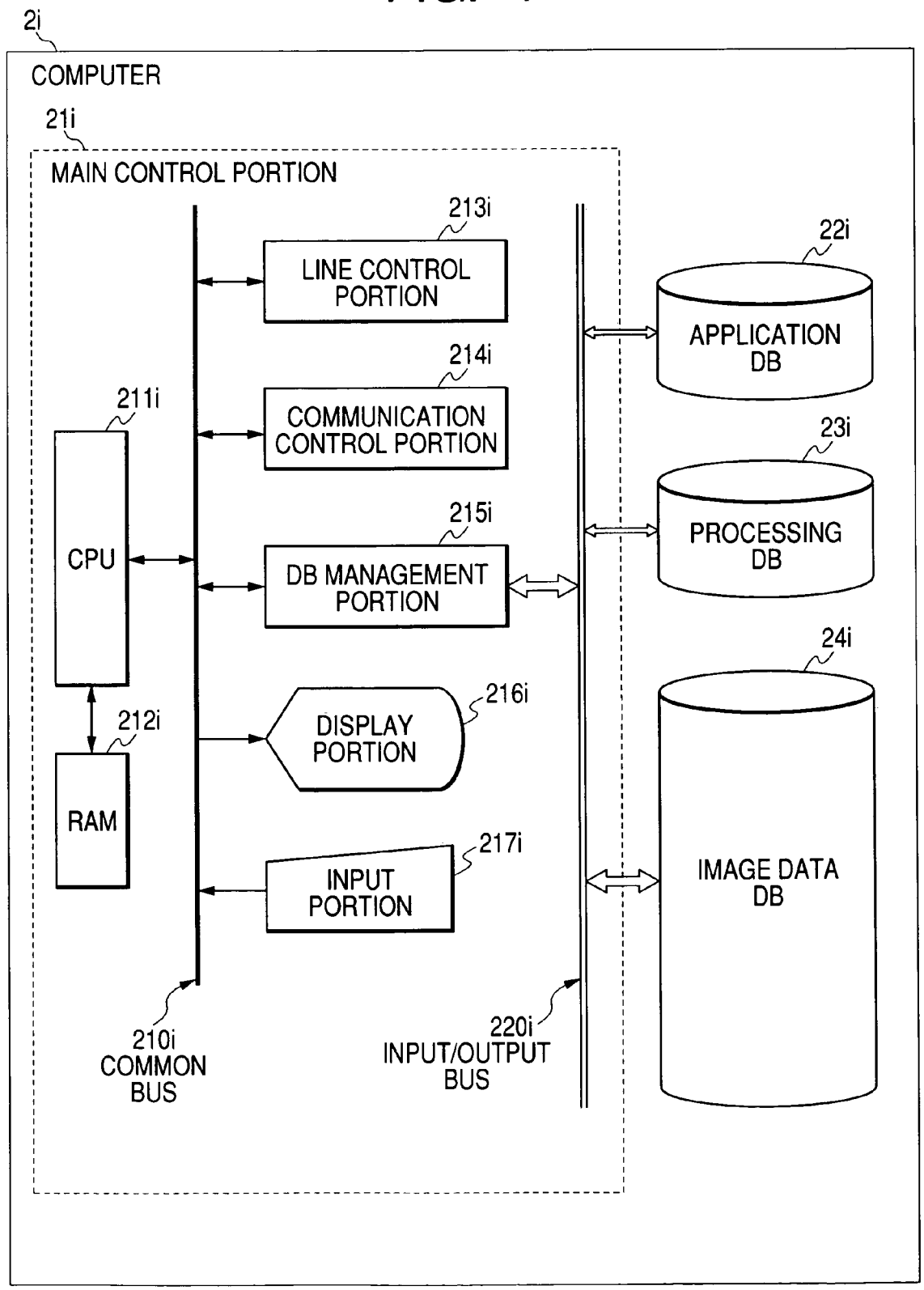
FIG. 4 is a block diagram showing the configuration of a node on the job accepting side in the volume rendering image processing system according to the embodiment of the invention.

FIG. 4 is a block diagram showing a configuration of node on the job accepting side in the volume rendering image processing system according to the embodiment of the invention.

In FIG. 4, the configuration of arbitrary node 2*i* on the job accepting side as shown in FIG. 2 is illustrated. The configuration of other nodes on the job accepting side is the same as the configuration of the node 2*i*.

The node on the job accepting side as shown in FIG. 4 comprises a main control portion 21*i* for controlling the entire system and processing the accepted job, an application DB (database) 22*i* used for general applications, a processing DB 23*i* which records information necessary for the processing of the accepted job, and an image data DB 24*i* storing the three dimensional digital data of the object obtained from CT scanner or other image acquiring system. When data amount is enormous, it is recommended that the image data DB 24*i* should be installed singly and shared among all the nodes.

The main control portion 21*i* comprises a CPU 211*i* which controls the entire system, a RAM 212*i* into which the three dimensional digital data of the object is read, a line control portion 213*i* having a router function, a communication control portion 214*i* having a communication function, a DB management portion 215*i* which controls each database, a display portion 216*i* for displaying the image data, an input portion 217*i* to input operation information, a common bus 210*i* which transmits a command and data between the CPU 211*i* and other components, and an input/output bus 220*i* which transmits a control signal and data between the DB management portion 215*i* and each database.

The RAM 212*i* stores the three dimensional digital data of the object read from the image data DB 24*i*, and supplies the three dimensional data to the CPU 211*i*, as needed.

The line control portion 213*i* is used for a connection to the communication network 10 as shown in FIG. 2, and concretely comprises a router mounting a digital service unit (DSU) or a firewall application to prevent invasion.

The communication control portion 214*i* controls the communication processing with other nodes. This communication control portion 214*i* may comprise an NTP (Network Time Protocol) server for time synchronization on the Internet, and an NFS (Network File System) server for distributed file system. The communication control portion 214*i* further holds an encryption communication protocol for encrypted data transfer, and enables to perform an encryption communication service.

The management portion 215*i* controls the application DB 22*i*, the management DB 23*i* and the image data DB 24*i*, by a command from the CPU 211*i*, and inputs or outputs data stored in the databases into or from the CPU 211*i*.

The display portion 216*i* displays the image of three dimensional structure corresponding to the three dimensional digital data of the object, by a command and a supply of the data from the CPU 211*i*.

The input/output portion 217*i* is used to allow the user to input a command required for volume rendering processing or display.

The same data, that is, the three dimensional digital data of the object obtained from CT scanner or other image acquiring system, is stored in advance in the DB management portions

215l to 215i to 215n, but it is desirable that the database should not be shared in order to avoid conflict at the time of reading.

The operation of the volume rendering image processing system according to the embodiment of the invention will be described below.

According to one aspect of the invention, a job is equally assigned to the nodes on the accepting side without considering the difficulty of the requested job or the load of the node on the accepting side.

In this case, the CPU 111m segments the jobs from each of the volume rendering processings on hand which are to be requested, and decides the priority of each job, the priority of processing sequence. At this time, the data corresponding to the volume rendering processing is read sequentially from the image data DB 14m into the RAM 112m and analyzed, as needed.

Then, after an execution request of the job, which has reached the processing order, is transmitted by simultaneous communication to the nodes (21 to 2k) on the accepting side and the other computers, such as clients, equivalent to the self computer, the job for self processing is put into execution. At this time, the data of the image data DB corresponding to the job is read into the RAM 112m for reference. When the process of the job for self processing is completed, the CPU 111m receives the processing result from an earliest one of the nodes on the accepting side that completes the processing of the execution request.

In this way, a plurality of clients, which are users, can exist, and other clients can be employed as the computing nodes in this invention. The term "client" as used herein means a computer as a job requesting unit, and a supercomputer containing a plurality of CPUs, a server, a personal computer, and a notebook personal computer may respectively be all one clients.

A computer can be both a node and a client at the same time. This means a job request may complete in a single computer, while plurality of computers for nodes are required to achieve performance.

The received processing result of the job is verified, and when there is no problem, a halt command of the job is transmitted to each of the other computers equivalent to the self computer which has accepted the job and the other nodes on the job accepting side.

At this time, the CPU 111m verifies whether or not all the jobs on hand which should be requested have been completed, and if any uncompleted requested job on hand remains, a series of a plurality of processing is repeated, starting with the simultaneous communication of the job which has reached the processing order.

According to a further aspect, a job is assigned to one or more node groups on the accepting side by considering the difficulty of the requested job or the load of the node group on the accepting side.

In this case, the CPU 111m segments the jobs from each of a plurality of the volume rendering processing requests, and prioritize each segmented job, which means prioritizing processing sequence. At this time, data corresponding to the volume rendering processing is read sequentially from the image data DB 14m into the RAM 112m and analyzed, as needed.

The contents of the priority include the priority that the requesting side, which is the client side, appends to the contents of the image processing, and the priority to make each computing node execute the image processing according to the load factor and history in the past on the request receiving side.

The priority according to the load factor involves issuing a heavy image processing command to the node group with light load, or issuing a light image processing command to the node group with heavy load, in accordance with the load factor of each node. Each node registers the self processing ability in a common job management portion, and reports the current processing content successively.

When prioritizing jobs, the client can access to the job management portion to know the processing ability of each node and the current processing content, and segments the image processing or selects a plurality of nodes to be requested, based on the processing ability and the current processing content.

The priority according to the history in the past involves issuing one specific instruction to the node group which is suitable for a certain image processing, and issuing another specific instruction to the node group which is suitable for another image processing, based on the history in the past. The nodes which are suitable for certain image processing are some nodes which are good a thigh-speed processing without using a large amount of memory, some nodes which are good at the processing using a large amount of memory but of slow-speed, and some nodes which do not require an enormous amount of data any more as a large amount of volume data is already accumulated.

Then, load information for the nodes (21 to 2k) on the accepting side and the other computers equivalent to the self computer is collected, the nodes (21 to 2k) on the accepting side and the other computers equivalent to the self computer are grouped for each acceptable job, and the corresponding job among the segmented jobs which has reached the processing order is assigned to each grouped nodes.

Then, each execution request of the assigned job is transmitted to the nodes (21 to 2k) on the accepting side and each of the other computers equivalent to the self computer simultaneously, and then the job for self processing is put into execution. At this time, the data of the image data DB corresponding to the job is read into the RAM 112m for reference. When the process of the job for self processing is completed, the CPU 111m receives the processing result from an earliest one of the nodes on the accepting side that completes the processing of the execution request.

The received processing result of the job is verified, and when there is no problem, a halt command of the job is transmitted to each of the other computers equivalent to the self computer which has accepted the job and the other nodes on the job accepting side, belonging to the same group as the node on the job accepting side which has completed the processing of the job the earliest.

At this time, the CPU 111m verifies whether or not all the jobs on hand which should be requested have been completed, and if any jobs to be requested on hand remains uncompleted, a series of processings is repeated, which starts with the collection of the load information of the other nodes.

The simultaneous communication means in the aspects of the invention described above may be broadcasting means which is unique to the communication network 10.

Each of the nodes which has accepted the job independently reads two dimensional tomographic image data layered along a direction perpendicular to the tomograph face, from the image database 24 into the RAM 212, makes necessary interpolation, obtains voxel data in a three dimensional array, and transmits it to the computer of request source.

At this time, a computation process of voxel data in the current cycle and the reading of two dimensional tomographic image data for the next cycle are started by separate tasks, and parallel operation for both is performed, there by shortening the processing time. In this connection, though the period of this cycle is decided according to the capacity of the RAM 212, a read-in area of the two dimensional tomographic image data in the RAM 212 can be dynamically relocated so as to make it substantially an infinite length.

A criterion as to whether or not the image processing is segmented for competition depends on whether or not the processing time is shortened even by performing the complicate process of segmenting the image processing, because the process itself of segmenting the image processing and unifying it again is complicated. Conversely, the image processing may not be segmented when the image processing is very light and simple.

Figure 5:
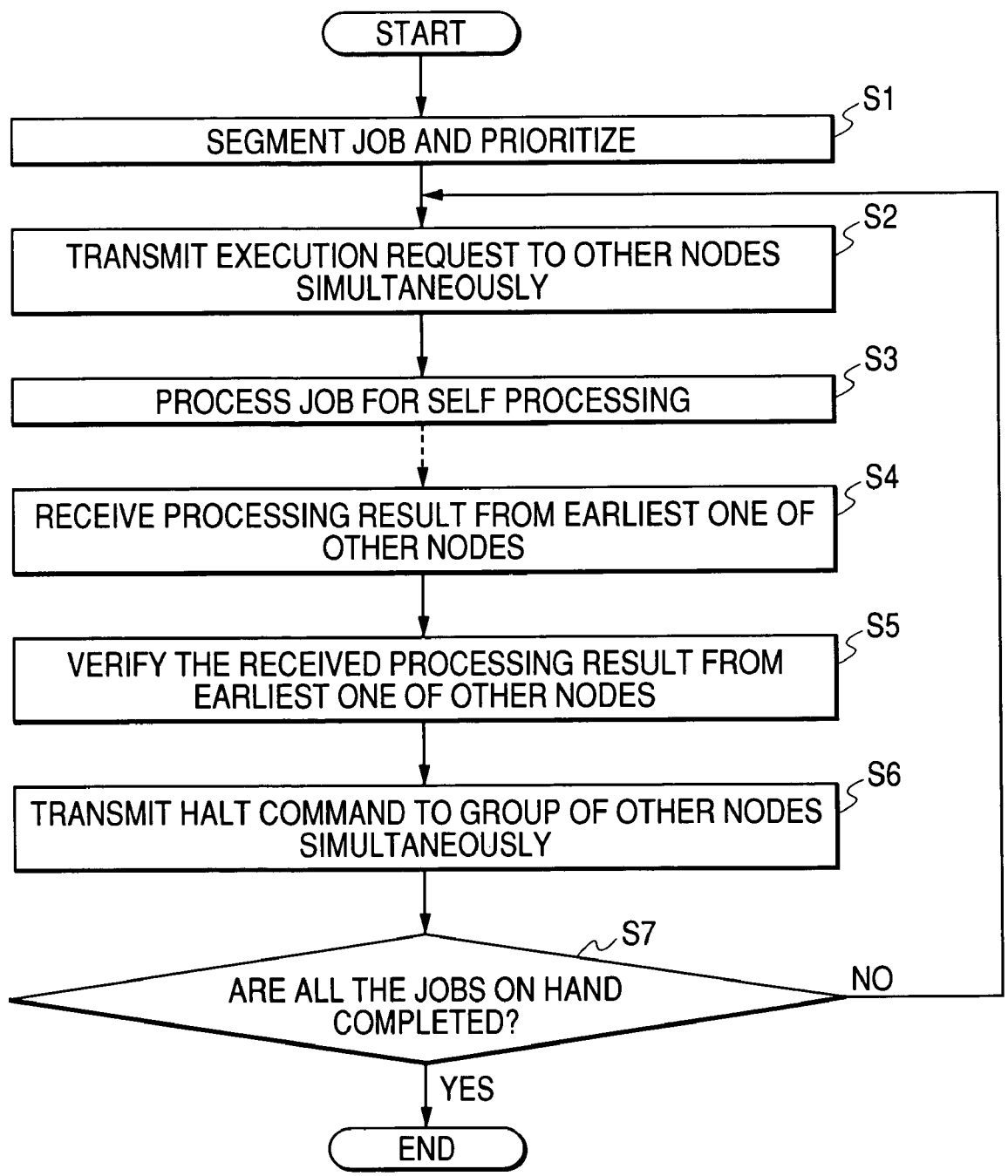
FIG. 5 is a flowchart showing an operation of a computer on the job requesting side in the volume rendering image processing system according to the embodiment of the invention.

FIG. 5 is a flowchart showing an operation of a computer on the job requesting side in the volume rendering image processing system according to the embodiment of the invention.

An operation of the computer on the job requesting side in the volume rendering image processing system according to the embodiment will be described below with reference to FIGS. 1 to 4 and using a flowchart shown in FIG. 5.

The operation of the computer on the job requesting side as shown in FIG. 5 is involved in a case where the job is equally assigned to the nodes on the accepting side without considering the difficulty or the load of the node on the accepting side.

First of all, in step S1, the CPU 111m segments the jobs from each of a plurality of the volume rendering processing requests, and prioritize the segmented jobs, which means prioritizing processing sequence.

Then, in step S2, the CPU 111m transmits one execution request of the job which has reached the processing order to the nodes (21 to 2k) on the accepting side and the other computers equivalent to the self computer simultaneously.

Then, in step S3, the CPU 111m processes the job for self processing.

Thereafter, in step S4, the CPU 111m receives the processing result from an earliest one of the nodes on the accepting side that completes the processing of the execution request.

Then, in step S5, the CPU 111m verifies the received processing result of the job.

Then, in step S6, the CPU 111m transmits a halt command of job to each of the other computers equivalent to the self computer which has accepted the job and the other nodes on the job accepting side.

Then, the CPU 111m verifies whether or not all the jobs to be requested on hand have been completed, and if any requested job on hand remains uncompleted, the operation returns to step S2. Also, if all the requested jobs on hand have been completed, the operation is ended in step S7.

FIG. 6 is a flowchart showing an operation of another computer on the job requesting side in the volume rendering image processing system according to the embodiment of the invention.

An operation of another computer on the job requesting side in the volume rendering image processing system according to the embodiment will be described below with reference to FIGS. 1 to 4 and using a flowchart shown in FIG. 6.

The operation of the computer on the job requesting side as shown in FIG. 6 is involved in a case where the job is assigned to one or more node groups on the accepting side by considering the difficulty of the requesting job or the load of the node groups on the accepting side.

First of all, in step S21, the CPU 111m segments the jobs from each of a plurality of the volume rendering processing requests, and prioritize the segmented jobs, which means prioritizing processing sequence.

Then, in step S22, the CPU 111m collects the load information for the nodes (21 to 2k) on the accepting side and the other computers equivalent to the self computer.

Then, in step S23, the CPU 111m groups the nodes (21 to 2k) on the accepting side and the other computers equivalent to the self computer for each job which is acceptable, and assigns the corresponding job to each of the grouped nodes.

Then, in step S24, the CPU 111m transmits one execution request of the assigned job to the nodes (21 to 2k) on the accepting side and the other computers equivalent to the self computer simultaneously.

Then, in step S25, the CPU 111m processes the job for self processing.

Thereafter, in step S26, the CPU 111m receives the processing result from an earliest one of the nodes on the accepting side that completes the processing of the execution request.

Then, in step S27, the CPU 111m verifies the received processing result of the job.

Then, in step S28, the CPU 111m transmits a halt command of job to each of the other computers equivalent to the self computer which has accepted the job and the other nodes on the job accepting side belonging to the same group as the earliest one of the nodes on the job accepting side that completes the processing for the job.

Then, the CPU 111m verifies whether or not all the jobs on hand which should be requested have been completed, and if any jobs to be requested on hand remains uncompleted, the operation returns to step S22. Also, if all the jobs to be requested on hand have been completed, the operation is ended in step S29.

In this embodiment, the system processes the jobs in the volume rendering image processing, but the system according to the invention may be generally employed for the processing of any other jobs. Particularly, the invention may be used as one scheme of the grid computing.

At least a part of the operation of the CPU 111m shown in FIG. 3 according to the invention is performed by controlling the computer, and a program which performs the operation by the procedure as shown in the flowcharts of FIGS. 5 and 6 may be stored and delivered in a computer readable recording medium such as a semiconductor memory, a CD-ROM, or a magnetic disk. A computer which is at least in the same category as a microcomputer, a personal computer, and a general-purpose computer may read and execute the program from the recording medium.

Though in the above example, the image processing operation is divided into plural blocks, and a plurality of operation processing blocks are competitively performed by each nodes, this invention has an additional function that, when the image processing is performed following a procedure from A computation to B computation to C computation, . . . , to obtain the final image, the final image processing is performed only in the console of the user, not being such a heavy operation.

That is, a part of computation can be assigned to a physical user console of the client . For example, it is preferable that the affine computation which is the last processing in a series of image processings on the computation of the volume rendering is assigned particularly to the physical user console.

Also, it is preferable that the WL transformation and affine transformation suitable for user presentation from a multi-bit image, which has a density of 9 bits or more, are assigned particularly to the physical user console.

Also, it is preferable that the processing of expansion, shrinking, and pan for the display on the user interface (UI) screen is assigned particularly to the physical user console.

Also, when a GPU is mounted, it is preferable that the above processing is assigned particularly to the GPU. The GPU stands for Graphic Processing Unit, a processor that is designed particularly for the image processing, compared to the general-purpose CPU, and usually mounted on the computer separately from the CPU. In this case, it is desirable that the GPU has a function of reading the control code dynamically and changing the processing contents during execution.

Also, it is preferable that the information of the patient, such as patient name, birthday, age and so on, which is the collateral information other than the image, is assigned particularly to the physical user console.

The physical user console may be a Web browser plug-in, a plug-in program.

Though in the distributed image processing as described above, the processing result of the job from the node that has completed the processing for the transmitted job at the earliest time is received and verified, and a job halt command is issued to other node groups except for the node that has completed the processing at the earliest time, the processing, especially for the nodes of slow-speed operation, may be stopped in mid course without waiting to receive the processing result of the job from the node that has completed the processing for the job the earliest, judging that there is no possibility of completing the processing for the job the earliest, whereby the wasteful processing is not continued and the operation is performed more efficiently.

To make this operation effective, it is necessary to provide means for acquiring the progress information of the job processing for each node which is processing the transmitted job, and means for transmitting a job halt command to one or more nodes processing the job based on the information acquired by the job processing progress information acquiring means.

Though the distributed processing of volume rendering has been described above in the embodiment, the distributed processing of the invention is not limited to the volume rendering as a matter of course, but maybe applied to the general image processings using volume data. For example, the invention is applicable to the region segmentation, filtering process, noise removal, image synthesis, flow perfusion, back projection, projection, geometry transformation, and so on. Particularly, the region segmentation is effectively performed, because it helps diagnosis by segmenting the surface and the central line representing the internal organs from the VOI, which stands for Volume of Interest, and drawing the image using segmented data.

The present invention has various advantages. As described above, in the volume rendering image processing system of the invention, the volume rendering process on hand is segmented into small jobs, each of the small jobs being assigned to the plurality of computers within the network, which includes the computers having a job request right equivalent to the self computer, and the processing result of the node which has completed the processing the earliest is received, whereby the volume rendering image processing system is provided in which the processing time of the volume rendering processing on hand is greatly shortened in total.

Also, an execution request of job is made without considering the actual load factor of the node on the job accepting side and the processing capability, it is possible to avoid the overhead of the computer on the job requesting side.

Also, the volume rendering image processing system is provided which can surely make the correspondence between the job to be assigned and the specific three dimensional digital data of the object obtained from CT scanner or other image acquiring system.

Also, the nodes accepting the job are grouped in view of the current load factor of the node accepting the job and the level of difficulty of the job, where by the volume rendering image processing system is provided in which the processing time of the volume rendering processing on hand is further greatly shortened in total.

Also, the volume rendering image processing system is provided in which an edit operation of the processing result, such as various transformation processings for displaying the result, can be performed on the side of the computer transmitting the execution request of job.

Also, the accepted job is processed in the node which can process the job the earliest as a result, whereby the volume rendering image processing system is provided in which the execution time of job is always optimized.

Also, the network to which the computers are connected is composed of the Internet or other connection lines including the Internet. Therefore, a wide-area system for volume rendering image processing is constructed without overhead, whereby the volume rendering image processing system is provided in which the processing time of volume rendering is always shortened substantially infinitely.

On one hand, in the field of database, the similar distributed processing is performed.

In the database system presented in "Speculative query processing", by N. Polyzotis and Y. Ioannidis, in Proceedings of the $1^{st}$ Biennial Conference on Innovative Data Systems Research (CIDR '03), the time taken for an instruction of data processing to be issued to a certain computer and the answer to be returned is usually in the order of several seconds to several minutes. Because it is difficult to know and predict the load state of the computer, the same instruction is issued to a plurality of computers, and the answer returned the earliest is adopted.

On the contrary, in the field of medical image processing, the time taken for an instruction of image processing to be issued and the answer to be returned is roughly predictable. Usually, the time is in the order of one-tenth to several seconds, whereby there is no need for competition in contrast to the database.

However, this invention has a feature that the result of image processing operation is not awaited contentedly within a predictable range, but the earliest processing result within the predictable range is adopted on the positive competition within the predicable range. In this way, an image display system is provided in which the waiting time of the user is shortened by displaying the image faster even in the order of one-tenth of a second within the predictable range, without waiting within the predictable range.

A second different point from the database is that the processing content is not segmented in the database, and accordingly the same instruction is necessarily issued to all the computers, whereas in the field of medical image processing, the image processing for obtaining one image is segmented into a heavy calculation process and a light calculation process in view of the load factor of each computer. For example, to calculate one display image, the image may be simply divided into ⅔ part from the top and ⅓ part in the latter to perform the image processing, or the procedure of image processing may be segmented into steps. Multiple computers with light load are made to compete in the heavy calculation process, while multiple computers with heavy load are made to compete in the light calculation process.

Alternatively, the image processing operation may be segmented into three or more steps, which are light, middle and heavy, and multiple computers compete in each steps. In this way, it is a feature that one image processing is segmented into heavy calculation process and light calculation process, and this feature is not provided for the database in which only the same instruction is issued.

In segmenting the processing content, in the field of image processing other than the volume rendering, the processing content is very light, and less efficient if divided, whereby there was no need for dividing the image processing content on purpose. In the heavy processing such as volume rendering, it is useful to divide the processing content into processing blocks to compete in.

In the image processing system of this invention, a volume data of an object obtained from a CT scanner is used for volume rendering. However, a volume data can be obtained from MRI or image data database or any other tomographic image device of the human body and living beings.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An image processing system for generating an image of a three dimensional structure using a volume data of an object, said image processing system having a first plurality of computers on a job requesting side and a second plurality of nodes on a job accepting side coupled via a network, where at least one of a group of computers on a job requesting side is constituted in combination with a control portion comprising at least a processor, a memory, a communication control portion, and a database management portion, and a storage media including at least an image data database, said control portion being operative to:

segment a plurality of jobs from each of a plurality of image processing requests in an image processing operation that use the volume data;

prioritize each of said segmented jobs;

transmit an execution request of said segmented jobs to said second plurality of nodes on the job accepting side, wherein each of the nodes on the job accepting side have a different processing power, and further wherein the second plurality of nodes on the job accepting side read volume data related to said jobs from the image database;

verify a processing result of said jobs by receiving said processing results of said jobs from an earliest one of said first plurality of computers and said second plurality of nodes that completes processing of said execution request; and transmit a halt command of said jobs to said first plurality of computers and said second plurality of nodes, except for said earliest one of said first plurality of computers and said second plurality of nodes.

2. An image processing system for generating an image of a three dimensional structure using a volume data of an object, said image processing system having a first plurality of computers on a job requesting side and a second plurality of nodes on a job accepting side coupled via a network, where at least one of a group of computers on a job requesting side is constituted in combination with a control portion comprising at least a processor, a memory, a communication control portion, and a database management portion, and a storage media including at least an image data database, said control portion being operative to:

segment a plurality of jobs from each of a plurality of image processing requests in an image processing operation that use the volume data;

prioritize each of said segmented jobs;

transmit an execution request of said segmented jobs to said second plurality of nodes on the job accepting side, wherein each of the nodes on the job accepting side have a different processing power, and further wherein the second plurality of nodes on the job accepting side read volume data related to said jobs from the image database;

acquire a progress information in each computer or node which is processing said jobs; and transmit a halt command of said execution request to one or more computers or nodes processing said jobs, based on said progress information.

3. The image processing system using said volume data according to claim 1 or 2, characterized in that the image processing using said volume data includes at least one or more processing among a volume rendering processing, a region segmentation processing, a filtering processing, a noise removal processing, an image synthesis processing, a perfusion computation processing, a back projection processing, a projection processing, and a geometry transformation processing.

4. The image processing system using said volume data according to claim 1 or 2, characterized in that in segmenting said plurality of jobs, said jobs are segmented by analyzing three dimensional digital data of an object corresponding to said image processing using said volume data.

5. The image processing system using said volume data according to claim 1 or 2, characterized in that before segmenting said plurality of jobs, in said computer transmitting the execution request of said jobs, a load factor of other computers and nodes connected via the network is verified, and the computers and nodes to which said jobs are transmitted are grouped, based on said load factor and a difficulty of each of said segmented jobs.

6. The image processing system using said volume data according to claim 1 or 2, characterized in that in said computer transmitting the execution request of said jobs, a job for self processing is executed after simultaneous transmission of the execution request of said jobs.

7. The image processing system using said volume data according to claim 1 or 2, characterized in that each of the nodes receiving the execution request of said jobs performs the image processing corresponding to said jobs, independently of other nodes, and transmits the processing result to said computer transmitting the execution request of said jobs.

8. The image processing system using said volume data according to claim 1 or 2, characterized in that said network is composed of the Internet or other connection lines including the Internet.

9. The image processing system using said volume data according to claim 1 or 2, characterized in that the image processing at the final step of said image processing using said volume data is performed only on a console of user.

10. The image processing system using said volume data according to claim 9, characterized in that the image processing at the final step of said image processing using said volume data is performed within a graphic processing unit of the console of the user.

11. A method of image processing for generating an image of a three dimensional structure using a volume data of an object, where a first plurality of computers on a job requesting side and a second plurality of nodes on a job accepting side coupled via a network are provided, said method comprising:

segmenting a plurality of jobs from each of a plurality of image processing requests in an image processing operation that use the volume data in at least one of a group of computers on a job requesting side;

prioritizing each of said segmented jobs;

transmitting an execution request of said segmented jobs to said second plurality of nodes on the job accepting side, wherein each of the nodes on the job accepting side have a different processing power, and further wherein the second plurality of nodes on the job accepting side read volume data related to said jobs from the image database;

verifying a processing result of said jobs by receiving said processing results of said jobs from an earliest one of said first plurality of computers and said second plurality of nodes that completes processing of said execution request; and transmitting a halt command of said jobs to said first plurality of computers and said second plurality of nodes, except for said earliest one of said first plurality of computers and said second plurality of nodes.

12. A method of image processing for generating an image of a three dimensional structure using a volume data of an object, where a first plurality of computers on a job requesting side and a second plurality of nodes on a job accepting side coupled via a network are provided, said method comprising:

segmenting a plurality of jobs from each of a plurality of image processing requests in an image processing operation that use the volume data in at least one of a group of computers on a job requesting side;

prioritizing each of said segmented jobs;

transmitting an execution request of said segmented jobs to said second plurality of nodes on the job accepting side, wherein each of the nodes on the job accepting side have a different processing power, and further wherein the second plurality of nodes on the job accepting side read volume data related to said jobs from the image database;

acquiring a progress information in each computer or node which is processing said jobs; and transmitting a halt command of said execution request to one or more computers or nodes processing said jobs, based on said progress information.

13. The image processing system according to claim 1 or 2, wherein each of the nodes on the job accepting side have a different load factor.

\* \* \* \* \*

UNITED STATES PATENT AND TRADEMARK OFFICE
CERTIFICATE OF CORRECTION

PATENT NO.       : 7,647,593 B2
APPLICATION NO.  : 10/954876
DATED            : January 12, 2010
INVENTOR(S)      : Kazuhiko Matsumoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1504 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,647,593 B2 | Page 1 of 1 |
| APPLICATION NO. | : 10/954876 | |
| DATED | : January 12, 2010 | |
| INVENTOR(S) | : Kazuhiko Matsumoto | |

It is certified that error appears in the above-identified patent and that said Letters Patent is hereby corrected as shown below:

On the Title page, Item (74), the Attorney, Agent or Firm should be listed as "Pearne & Gordon LLP", In the specification, column 6, line 42, please replace the word "in" to --1n--, In the specification, column 6, line 51, please replace the first "in" to --1n--, In the specification, column 7, line 65, please insert the word --by-- after the word "14m," and before the word "a", In the specification, column 10, line 67, please delete the space between the word "there" and the word "by".

Signed and Sealed this
Eighth Day of March, 2011

David J. Kappos
*Director of the United States Patent and Trademark Office*